(12) United States Patent  
Sakai et al.

(10) Patent No.: US 6,992,827 B2
(45) Date of Patent: Jan. 31, 2006

(54) ANTIGLARE FILM, METHOD FOR FABRICATING THE SAME, POLARIZER ELEMENT AND DISPLAY DEVICE EMPLOYING THE SAME, AND INTERNAL DIFFUSION FILM

(75) Inventors: Akira Sakai, Souraku-gun (JP); Motohiro Yamahara, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/277,405

(22) Filed: Oct. 22, 2002

(65) Prior Publication Data

US 2003/0081320 A1    May 1, 2003

(30) Foreign Application Priority Data

Oct. 23, 2001   (JP)   ............................. 2001-324848
Jun. 3, 2002    (JP)   ............................. 2002-161762

(51) Int. Cl.
     *G02B 13/20*   (2006.01)
(52) U.S. Cl. ..................... 359/599; 359/601; 359/613
(58) Field of Classification Search ............... 359/614,
              359/599, 601, 613, 452, 707, 492, 539–541
     See application file for complete search history.

(56) References Cited

U.S. PATENT DOCUMENTS

| 4,772,102 | A | * | 9/1988 | Fergason et al. | ............... 349/86 |
| 5,418,631 | A | * | 5/1995 | Tedesco | ........................ 359/15 |
| 6,164,785 | A | | 12/2000 | Maekawa | ..................... 359/613 |
| 6,517,914 | B1 | | 2/2003 | Hiraishi | ...................... 428/1.1 |

FOREIGN PATENT DOCUMENTS

| JP | 04-314522 | 11/1992 |
| JP | 06-018706 | 1/1994 |
| JP | 11-305010 | 11/1999 |
| JP | 2000-338311 | 12/2000 |
| JP | 2001-091707 | 4/2001 |

* cited by examiner

*Primary Examiner*—Drew A. Dunn
*Assistant Examiner*—Joshua L Pritchett
(74) *Attorney, Agent, or Firm*—David G. Conlin; David A. Tucker; Edwards & Angell, LLP

(57) ABSTRACT

An antiglare film has an internal diffusion layer, composed of a transparent matrix and a transparent diffusive material, and surface irregularities. The diffusive material has a different refractive index from the transparent matrix, exhibits anisotropic diffusion resulting from the anisotropic shape of the particles thereof, and is dispersed in the transparent matrix so that the particles are oriented parallel to one another and to a normal to the film.

11 Claims, 4 Drawing Sheets

ANTIGLARE FILM, METHOD FOR FABRICATING THE SAME, POLARIZER ELEMENT AND DISPLAY DEVICE EMPLOYING THE SAME, AND INTERNAL DIFFUSION FILM

BACKGROUND OF THE INVENTION

1. Field of the Invention

The present invention relates to an antiglare film provided on the display surface side of a high-resolution image display device such as a CRT or LCD used for image display in a computer, word processor, television monitor, or the like. The present invention relates also to a method for fabricating an antiglare film, and to a polarizer element and a display device employing an antiglare film. The present invention relates, in addition, to an internal diffusion film.

2. Description of the Prior Art

Conventionally, display devices as mentioned above are used for image display in computers, word processors, television monitors, and the like. In recent years, as higher and higher resolutions are sought in applications such as in monitors for computers, display devices have come to be given higher and higher resolutions. The pace of this trend is especially fast in LCDs, where remarkable technical developments have been made in connection with p-Si. Such a display device is generally provided, on the display surface side thereof, with an antiglare film treated with various kinds of antiglare treatment. This helps reduce the glare resulting from reflection of external light as from a window or indoor illumination and the glare resulting from light emanating from within the display device.

Conventional examples of such antiglare films are as follows. Japanese Patent Application Laid-Open No. H6-18706 discloses an antiglare layer formed on a transparent substrate and consisting essentially of resin beads having a refractive index of 1.40 to 1.60 and an ionizing-radiation-curable resin composition. Japanese Patent Application Laid-Open No. H10-20103 discloses a multilayer film consisting of at least a base film and an antiglare layer containing 20 to 30 parts by weight of transparent particles having an average particle diameter of 0.5 to 1.5 µm in 100 parts by weight of curable resin.

These antiglare films are formed by applying a resin containing a filler such as silicon dioxide (silica) to the surface of a transparent base film. These antiglare films are grouped into those in which surface irregularities are formed on the surface of the antiglare layer by coagulation of coagulative silica or the like, those in which surface irregularities are formed on the layer surface by addition, to the resin, of an organic filler having a particle diameter greater than the thickness of the applied resin film, those in which surface irregularities are transferred by laminating the layer surface with a film having surface irregularities, and the like.

On the other hand, Japanese Patent Application Laid-Open No. 2001-91707 discloses an optical film having an antiglare layer laid on a transparent support member wherein the antiglare layer has a haze of 4.0 to 50.0%, where the haze is defined as the total of internal diffusion of 1.0% or higher and surface diffusion of 3.0% or higher. This is an antiglare film employing an internal diffusion layer, which has fine particles dispersed inside the layer to cause diffusion.

However, the structures disclosed in Japanese Patent Application Laid-Open No. H6-18706 and Japanese Patent Application Laid-Open No. H10-20103 mentioned above both depend solely on the surface irregularities on the antiglare layer to produce an antiglare effect. Thus, to enhance the antiglare effect, the surface irregularities need to be made larger. However, making the surface irregularities larger results in increasing the haze value (diffused-light transmittance divided by total transmittance) of the applied resin film. This lowers the sharpness of the transmitted image accordingly.

Moreover, when an antiglare film of a conventional type as described above is used on the display surface side of a high-resolution image display device, random shining, called scintillation, occurs. This lowers the viewability of the display surface. Scintillation occurs as a result of the curvatures of the surface irregularities serving as lenses, magnifying pixels when their positions happen to coincide with the foci of those lenses. In an antiglare film of a conventional type, the surface irregularities are formed randomly, and therefore it is impossible to control the foci of the lenses they pretend to be, making scintillation inevitable.

On the other hand, the structure disclosed in Japanese Patent Application Laid-Open No. 2001-91707 prevents light from traveling straight inside the layer, and thus suffers less from scintillation. However, the display performance obtained here is dependent on viewing angle. Specifically, when this structure is used in a display device in which light leaks obliquely during display of black, light leaking obliquely is deflected to travel straight forward. This lowers the contrast ratio as observed frontally.

SUMMARY OF THE INVENTION

An object of the present invention is to provide an antiglare film that alleviates scintillation without lowering transmitted image sharpness and frontal contrast ratio, a method for fabricating such an antiglare film, and a polarizer element and a display device employing such an antiglare film.

To achieve the above objects, according to the present invention, an antiglare film is provided with an internal diffusion layer, composed of a transparent matrix and a transparent diffusive material, and surface irregularities. The diffusive material has a different refractive index from the transparent matrix, exhibits anisotropic diffusion resulting from the anisotropic shape of the particles thereof, and is dispersed in the transparent matrix so that the particles are oriented substantially parallel to one another and to a normal to the film.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
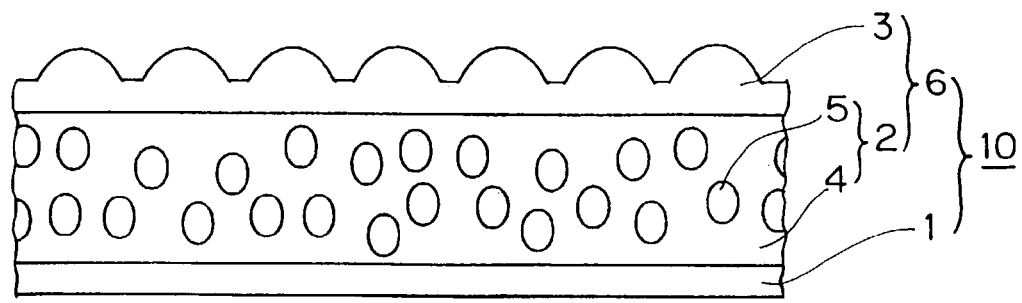
FIG. 1 is a sectional view showing the layer structure of an antiglare film embodying the invention.

Hereinafter, embodiments of the present invention will be described with reference to the drawings. The scintillation described earlier resulting from surface irregularities functioning as lenses can be prevented, for example, by shifting the foci of those lenses frontward, or by making the foci uniform, or by preventing light from traveling straight. The most effective among these is preventing straight traveling of light.

This can be achieved, for example, by making the internal refractive index uneven, i.e., deflecting light by using an uneven structure having gradient refractive indices, or by adding particles having a different refractive index, i.e. diffusive particles. Particularly simple is using an internal diffusion layer having diffusive particles added thereto. By this method, it is possible to realize an antiglare film for a high-resolution image display device which suffers less from scintillation.

Moreover, with an antiglare film, like one embodying the invention, that depends on both an internal diffusion layer and surface irregularities to produce an antiglare effect, it is possible to control independently and accurately the haze originating from the internal diffusion layer and the haze originating from the surface irregularities. This makes it possible to design the antiglare film to produce an antiglare effect without lowering the sharpness of the transmitted image.

In an antiglare film employing an internal diffusion layer, the lowering of frontal contrast ratio can be prevented by preventing obliquely incident light from leaking frontward as a result of such light being deflected by the internal diffusion caused by the internal diffusion layer. To achieve this, the internal diffusion layer needs to be so prepared as to exhibit different diffusion characteristics for light incident at different angles, i.e., anisotropic diffusion, so that it exhibits a low degree of diffusion for obliquely incident light. This permits such light, when it passes through the internal diffusion layer, to continue traveling obliquely without being diffused.

The factors that determine the diffusion characteristics of a film, like the internal diffusion layer used in an antiglare film embodying the invention, that has a diffusive material dispersed in a transparent matrix include the size and particle density of the diffusive material, the film thickness, and the difference in refractive index between the matrix and the diffusive material. In general, when the size of the diffusive material is sufficiently small, the film diffuses light evenly frontward and rearward; however, as the particle size becomes larger, the film exhibits narrower and narrower diffusion characteristics, diffusing more and more light frontward.

Moreover, the higher the particle density, the more light is diffused multiply, and thus the wider the diffusion characteristics obtained. Likewise, the greater the film thickness, the more light is diffused multiply, and thus the wider the diffusion characteristics obtained. Furthermore, the greater the difference in refractive index between the matrix and the diffusive material, the wider the diffusion characteristics obtained, and the more light is diffused rearward. Accordingly, the internal diffusion layer can be made to exhibit anisotropic diffusion by making one of the above-mentioned factors anisotropic. In the present invention, the purpose is accomplished by giving the diffusive material an anisotropic shape so that the effective size of the diffusive material varies according to the angle at which light is incident thereon.

FIG. 1 is a sectional view showing the layer structure of an antiglare film as an embodiment of the invention. As shown in this figure, the antiglare film 10 of this embodiment is composed of a transparent base 1, an internal diffusion layer 2 laid on top, and a surface irregularities layer 3 laid further on top. The internal diffusion layer 2 and the surface irregularities layer 3 together form an antiglare layer 6. The internal diffusion layer 2 is composed of a transparent matrix 4 and a diffusive material 5 having an anisotropic shape, having a different refractive index from the transparent matrix 4, and dispersed in the transparent matrix 4 evenly so that the particles of the diffusive material 5 are located in positions shifted translationally from one another in an orderly fashion.

In this way, the antiglare layer 6 is formed by combining together the internal diffusion layer 2 and the surface irregularities layer 3. This makes it possible to control independently and accurately the haze originating from the internal diffusion layer and the haze originating from the surface irregularities. Thus, it is possible to design the antiglare film to produce an antiglare effect without lowering the sharpness of the transmitted image.

Figure 2:
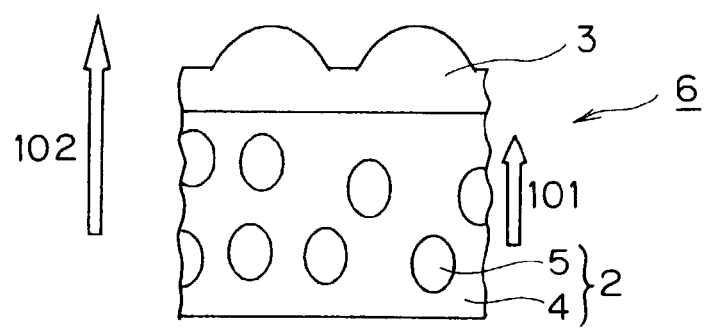
FIG. 2 is a sectional view showing the structure of the antiglare layer in this embodiment.

FIG. 2 is a sectional view showing the structure of the antiglare layer in this embodiment, and shows the internal diffusion layer exhibiting anisotropic diffusion. As shown in this figure, in the internal diffusion layer 2 here, the diffusive material 5, of which the particles have the shape of a spheroid, is dispersed in the transparent matrix 4 in such a way that the major axis, of which the direction is indicated by arrow 101, of the particles is substantially parallel to a normal, of which the direction is indicated by arrow 102, to the antiglare layer 6 and thus to the antiglare film.

Figure 3:
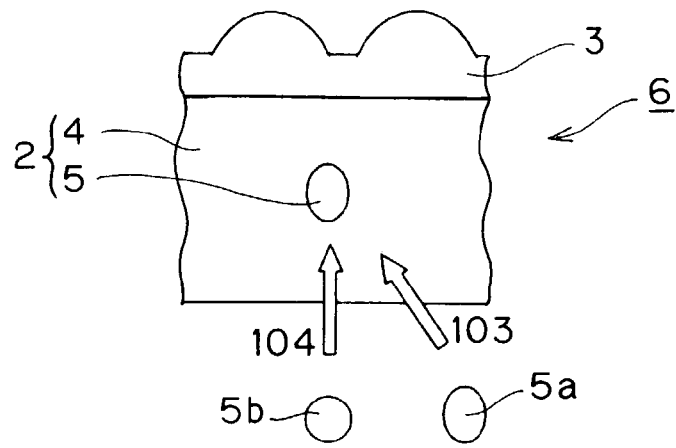
FIG. 3 is a sectional view illustrating how anisotropic diffusion occurs in the internal diffusion layer.

FIG. 3 is a sectional view illustrating how anisotropic dispersion occurs in the internal diffusion layer. Now, with reference to this figure, the anisotropic dispersion that occurs in an antiglare film embodying the invention will be described. As shown in the figure, the effective size of the diffusive material 5 for light obliquely incident on the internal diffusion layer 2, as indicated by arrow 103, is indicated by 5a. On the other hand, the effective size of the diffusive material 5 for light incident head-on on the internal diffusion layer 2, as indicated by arrow 104, is indicated by 5b. The head-on direction indicated by arrow 104 is parallel to a normal to the antiglare film. Here, the effective size 5a is larger than the effective size 5b. Accordingly, the antiglare film exhibits narrower diffusion characteristics for light incident obliquely than for light incident head-on.

Figure 4:
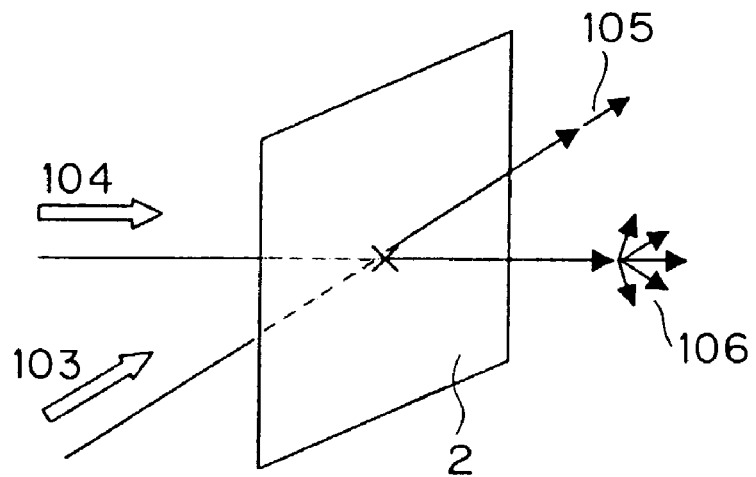
FIG. 4 is a perspective view illustrating the anisotropic diffusion that occurs in the internal diffusion layer.

FIG. 4 is a perspective view illustrating the anisotropic diffusion that occurs in the internal diffusion layer. Now, with reference to this figure, the anisotropic dispersion that occurs in an antiglare film embodying the invention will be described once more. As shown in the figure, when light is incident head-on on the internal diffusion layer 2 as indicated by arrow 104, the light is diffused by the internal diffusion layer 2, and thus exits therefrom as diffused light as indicated by arrow 106. On the other hand, when light is obliquely incident on the internal diffusion layer 2 as indicated by arrow 103, the light is hardly diffused by the internal diffusion layer 2, and thus exits therefrom simply as parallel transmitted light.

Figure 5:
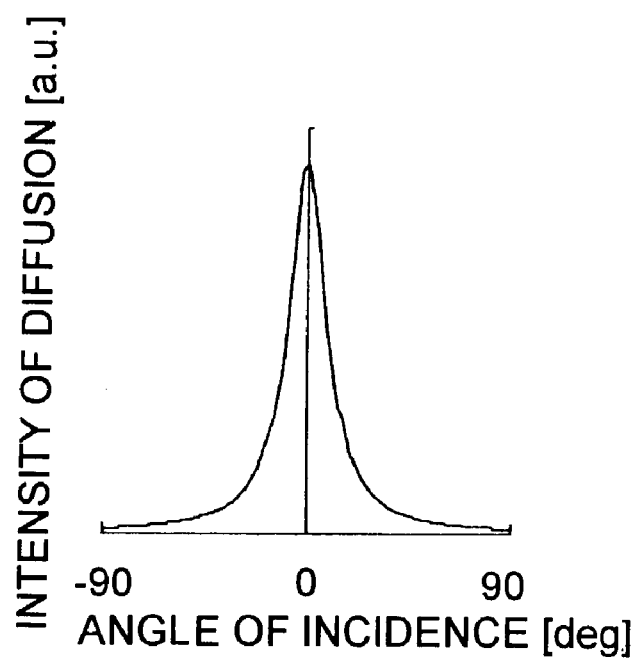
FIG. 5 is a graph showing the anisotropic diffusion exhibited by an antiglare film embodying the invention.

FIG. 5 is a graph showing the anisotropic diffusion exhibited by an antiglare film embodying the invention. In this figure, along the horizontal axis is taken the angle of incidence (in degrees), and along the vertical axis is taken the intensity of diffusion (in a.u.). As shown in the figure, the antiglare film exhibits a high degree of diffusion for light incident head-on and a low degree of diffusion for light incident obliquely. This means that the antiglare film hardly diffuses obliquely incident light, and permits such light to exit therefrom as substantially parallel transmitted light.

Figure 6:
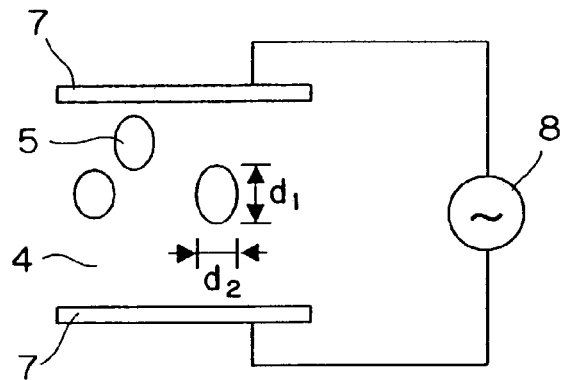
FIG. 6 is a diagram showing an example of a method for fabricating an antiglare film embodying the invention.

FIG. 6 is a diagram showing an example of a method for fabricating an antiglare film embodying the invention. As shown in this figure, first, to the transparent matrix 4, the diffusive material 5, transparent and having a different refractive index therefrom, is mixed so as to be dispersed therein. The mixture is then sandwiched between two electrodes 7, to which an alternating-current power source 8 is connected. This produces, between the electrodes 7, an alternating-current electric field, by which the diffusive material 5 is so deformed as to have an anisotropic shape.

Here, the factor of deformation D of the diffusive material is defined by formula (1) below.

$$D = \frac{d_1 - d_2}{d_1 + d_2} \quad (1)$$

where $d_1$ represents the diameter of the diffusive material as measured in the direction of the electric field; and $d_2$ represents the diameter of the diffusive material as measured perpendicularly to the direction of the electric field.

The factor of deformation D is given by formulae (2) and (3) below.

$$D = \frac{9\varepsilon_0 K_2}{16\gamma} \phi E_0^2 b \quad (2)$$

$$\phi = 1 - \frac{q(19\lambda + 16)] + 15a^2\omega^2(\lambda + 1)(2q + 1)}{5(\lambda + 1)[(2R + 1)^2 + a^2\omega^2(q + 2)^2]} \quad (3)$$

$$R(11\lambda + 14) + R^2[15(\lambda + 1) +$$

where $K_1$ represents the relative dielectric constant of the diffusive material;

$K_2$ represents the relative dielectric constant of the transparent matrix;

$\chi_1$ represents the specific resistance of the diffusive material;

$\chi_2$ represents the specific resistance of the transparent matrix;

$\mu_1$ represents the coefficient of viscosity of the diffusive material;

$\mu_2$ represents the coefficient of viscosity of transparent matrix;

b represents the initial radius of the diffusive material;

$\gamma$ represents the interfacial tension between the diffusive material and the transparent matrix;

$\omega$ represents the frequency of the alternating-current electric field;

$E_0$ represents the effective amplitude;

$\varepsilon_0$ represents the dielectric constant of vacuum;

$q = K_1/K_2$;
$R = \chi_1/\chi_2$;
$\lambda = \mu_1/\mu_2$; and
$\alpha = \epsilon_0 \chi_1 K_2$ To deform the diffusive material so that it has the shape of a spheroid having its major axis aligned with the direction of the electric field, the factor of deformation D of the diffusive material needs to be positive. This is achieved by selecting appropriate materials for the diffusive material and the transparent matrix so that $\phi > 0$ and appropriately setting the frequency $\omega$ of the alternating-current electric field. Specifically, when the condition expressed by formula (4) below is fulfilled, then $\phi \geq 0$, and the diffusive material is so deformed as to have the shape of a spheroid having its major axis aligned with the direction of the electric field. It is to be noted that, when $R = q = 1$, then $\phi = 0$, and the diffusive material is not deformed at all.

$$Rq < 1 + \frac{5(\lambda + 1)}{19\lambda + 16} \frac{(R - 1)^2}{R} \quad (4)$$

Alternatively, when the condition expressed by formula (5) below is fulfilled, or when the frequency $\omega$ of the alternating-current electric field fulfills the condition expressed by formula (6) below, then $\phi > 0$, and the diffusive material is so deformed as to have the shape of a spheroid having its major axis aligned with the direction of the electric field. When the condition expressed by formula (6) is not fulfilled, then $\phi \leq 0$, and the diffusive material is so deformed as to have the shape of a spheroid having its major axis perpendicular to the direction of the electric field $$1 + \frac{5(\lambda + 1)}{19\lambda + 16} \frac{(R - 1)^2}{R} \leq Rq \quad (5)$$

$$\omega > \frac{\sqrt{R^2[q(19\lambda + 16) - 5(\lambda + 1)] - 3R(3\lambda + 2) - 5(\lambda + 1)}}{a|q - 1|\sqrt{5(\lambda + 1)}} \quad (6)$$

Figure 7:
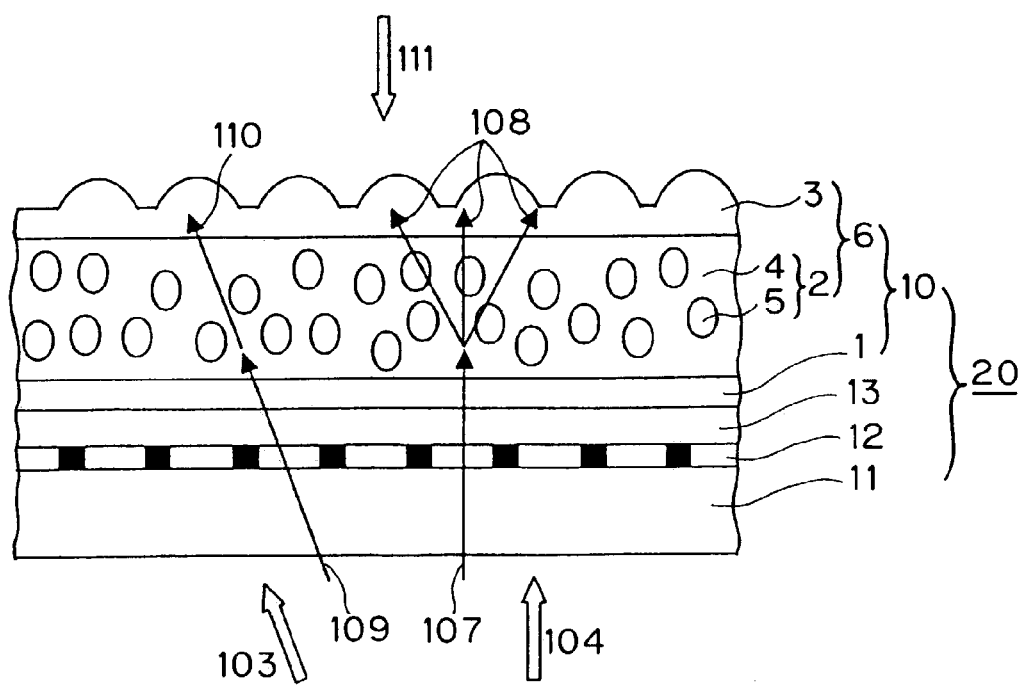
FIG. 7 is a sectional view showing an example of a display device employing an antiglare film embodying the invention.

Next, an example will be described in which an antiglare film embodying the invention is applied to a display device. FIG. 7 is a sectional view showing an example of a display device employing an antiglare film embodying the invention. As shown in this figure, a polarizer plate 13 is provided so as to cover pixels 12 on a display panel 11. On top of the polarizer plate 13, an antiglare film 10 as described above is laid so as to form a polarizer element together therewith. These layers together constitute a display device 20.

Light indicated by arrow 107, which is incident head-on on the display panel 11 as indicated by arrow 104, passes through the pixels 12, the polarizer plate 13, and the transparent base 1, and then enters the internal diffusion layer 2. This light is diffused inside the internal diffusion layer 2, and thus enters the surface irregularities layer 3 as diffused light as indicated by arrows 108. Here, the light incident on the lenses formed in the surface irregularities layer 3 is diffused light, and this alleviates the scintillation resulting from the surface irregularities functioning as lenses.

Likewise, light indicated by arrow 109, which is incident obliquely on the display panel 11 as indicated by arrow 103, passes through the pixels 12, the polarizer plate 13, and the transparent base 1, and then enters the internal diffusion layer 2. This light, however, is not diffused inside the surface irregularities layer 3, and thus enters the surface irregularities layer 3 as parallel transmitted light as indicated by arrow 110.

In general, when light is obliquely incident on the polarizer element, the apparent polarization axis deviates, and therefore, even when the display device is displaying a dark color, some of the light leaks. In a display device having a polarizer element provided on the display surface side, using a conventional antiglare film, i.e. one employing an internal diffusion layer that does not exhibit anisotropic diffusion, on that display surface side results in low frontal contrast ratio. This is because obliquely leaking light as described above is diffused in the internal diffusion layer, and part of the diffused light eventually exits therefrom in the direction of the observer as indicated by arrow 111.

By contrast, in a display device having a polarizer element provided on the display surface side, using an antiglare film like one embodying the invention, i.e. one employing an internal diffusion layer that exhibits anisotropic diffusion, on that display surface side permits obliquely leaking light as described above to exit as it is, i.e., as parallel transmitted light. Thus, there occurs no lowering of frontal contrast ratio.

Incidentally, experiments were conducted to evaluate how the anisotropic diffusion effect varies according to the shape of the spheroid. The results of the experiments show that a satisfactory anisotropic diffusion effect is produced when the ratio of the major axis to the minor axis of the spheroid is 2 or greater. The results also show that, the higher the ratio of the major axis to the minor axis, the more powerful the anisotropic diffusion effect, although the anisotropic diffusion effect starts being saturated when the ratio exceeds 20.

In this embodiment, the diffusive material is made to exhibit anisotropic diffusion by being deformed into the shape of a spheroid. However, so long as the diffusive material comes to exhibit anisotropic diffusion, it may be deformed into any other shape, for example, a rectangular parallelepiped or cylinder. In this embodiment, the diffusive material is deformed by application of an electric field. However, the diffusive material may be deformed in any other manner, for example, by application of a magnetic field or external pressure.

Figure 8:
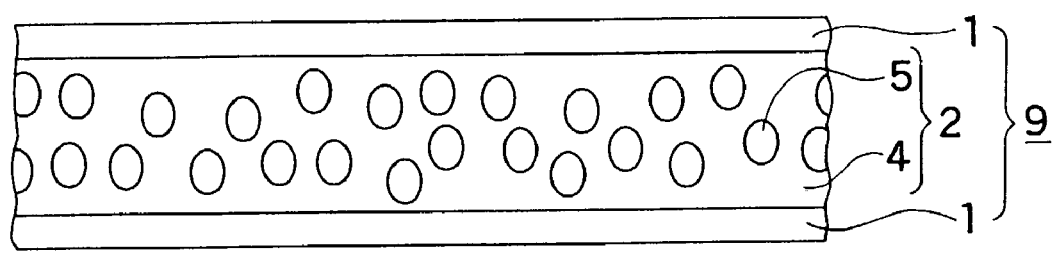
FIG. 8 is a sectional view showing the layer structure of an internal diffusion film embodying the invention.

FIG. 8 is a sectional view showing the layer structure of an internal diffusion film as another embodiment of the invention. As shown in this figure, the internal diffusion film 9 of this embodiment is composed of a transparent base 1, an internal diffusion layer 2 laid on top, and a transparent base 1 laid further on top. The internal diffusion layer 2 is composed of a transparent matrix 4 and a diffusive material 5 having an anisotropic shape, having a different refractive index from the transparent matrix 4, and dispersed in the transparent matrix 4 evenly so that the particles of the diffusive material 5 are located in positions shifted translationally from one another in an orderly fashion.

EXAMPLES

Hereinafter, practical examples of the present invention will be described. It is to be understood, however, that these examples are not intended to limit the implementation of the invention in any way.

Practical Example 1

In this example, first, a coating of the material of the internal diffusion layer (a mixture of a UV-curable resin and styrene beads prepared with toluene) is laid on a metal electrode, and then, on that side of the applied film opposite to the metal electrode, a transparent electrode was fitted. Then, an alternating-current voltage of 5 V, 30 Hz was applied to the material of the internal diffusion layer so as to deform the shape of the styrene beads, i.e., a diffusive material in the form of a microcapsule, and then the applied film was cured by application of UV light. In this way, an internal diffusion layer that exhibits anisotropic diffusion was obtained.

Subsequently, this internal diffusion layer was transferred onto a transparent base (triacetylcellulose film), and then, on top of the internal diffusion layer, a coating of the material of the surface irregularities layer (a mixture of a UV-curable resin and polycarbonate beads prepared with toluene) was laid. Then, the applied film was cured by irradiating it with UV light. In this way, an antiglare film that exhibits anisotropic diffusion was obtained. When observed from the front, this antiglare film appeared opaque owing to a high degree of diffusion; when observed obliquely, it appeared semitransparent owing to a medium degree of diffusion. In this way, the anisotropic diffusion of the antiglare film was confirmed satisfactorily by visual inspection.

Table 1 shows the results of evaluation of the characteristics obtained when the antiglare film of Practical Example 1 embodying the invention and, for comparison, two conventional antiglare films, Comparative Examples 1 and 2, were applied to a display device. The antiglare film of Comparative Example 1 has the same structure as that of Practical Example 1 except that the former has no internal diffusion layer. On the other hand, the antiglare film of Comparative Example 2 has an internal diffusion layer, but this internal diffusion layer does not exhibit anisotropic diffusion as does that of Practical Example 1. In other respects, the antiglare film of Comparative Example 2 has the same structure as that of Practical Example 1.

TABLE 1

|  | Practical Example 1 | Comparative Example 1 | Comparative Example 2 |
| --- | --- | --- | --- |
| Internal Diffusion Layer | Included (Anisotropic) | Not Included | Included (Isotropic) |
| Haze [%] | 30.0 | 30.0 | 30.0 |
| Frontal Contrast Ratio | 240 | 250 | 150 |
| Transmitted Image Sharpness [%] | 40.0 | 10.0 | 40.0 |
| Scintillation | Not Observed | Observed | Not Observed |

In Table 1, the haze was measured in compliance with JIS (the Japanese Industrial Standards) K-7105. The frontal contrast ratio was determined as follows. Polarizer plates were prepared each employing one of the antiglare films of Practical Example 1 and Comparative Examples 1 and 2, and were each laid on a 15-inch UXGA liquid crystal panel (TN mode). Then, with each of these combinations, the white brightness to the black brightness as observed from the front of the panel were measured, and the ratio of the former to the latter was determined as frontal contrast ratio.

The sharpness of the transmitted image was measured in compliance with JIS K-7105, and the value observed when the width of the optical comb was 0.5 mm was used as the measurement result. The scintillation was determined as follows. Polarizer plates were prepared each employing one of the antiglare films of Practical Example 1 and Comparative Examples 1 and 2, and were each laid on a 15-inch UXGA liquid crystal panel (TN mode). Then, with each of these combinations, a solid green pattern was displayed on the entire liquid crystal panel, and whether scintillation was observed or not was visually checked by 10 people. A combination that eight or more people evaluated as free from scintillation is indicated as "not observed," and any other combination as "observed."

As Table 1 shows, with Practical Example 1 embodying the invention, it is possible to alleviate scintillation while maintaining satisfactorily high frontal contrast ratio and transmitted image sharpness. By contrast, with Comparative Example 1, which employs no internal diffusion layer, it is not possible to alleviate scintillation, nor is it possible to obtain satisfactory transmitted image sharpness. With Comparative Example 2, which employs an internal diffusion layer that exhibits isotropic diffusion, it is possible to alleviate scintillation and obtain satisfactory transmitted image sharpness, but with markedly lower frontal contrast ratio.

Practical Example 2

In this example, first, a coating of the material of the internal diffusion layer (a mixture of a UV-curable resin and styrene beads prepared with toluene) is laid on a metal electrode, and then, on that side of the applied film opposite to the metal electrode, a transparent electrode was fitted. Then, an alternating-current voltage of 5 V, 30 Hz was applied to the material of the internal diffusion layer so as to deform the shape of the styrene beads, i.e., a diffusive material, and then the applied film was cured by application of UV light. In this way, an internal diffusion layer that exhibits anisotropic diffusion was obtained.

Subsequently, on both surfaces of this internal diffusion layer, two transparent bases (triacetylcellulose film) were laid as protective layers. In this way, an internal diffusion film that exhibits anisotropic diffusion was obtained. When observed from the front, this internal diffusion film appeared opaque owing to a high degree of diffusion; when observed obliquely, it appeared semitransparent owing to a medium degree of diffusion. In this way, the anisotropic diffusion of the internal diffusion film was confirmed satisfactorily by visual inspection.

Table 2 shows the results of evaluation of the characteristics obtained when the internal diffusion film of Practical Example 2 embodying the invention and, for comparison, a conventional internal diffusion film, Comparative Example 3, were applied to a display device. The internal diffusion film of Comparative Example 3 has the same structure as that of Practical Example 2 except that the former does not exhibit anisotropic diffusion because it contains a diffusive material that does not have an anisotropic shape.

TABLE 2

|  | Practical Example 2 | Comparative Example 3 |
| --- | --- | --- |
| Internal Diffusion Layer | Anisotropic | Isotropic |
| Haze [%] | 20.0 | 20.0 |
| Frontal Contrast Ratio | 240 | 150 |
| Scintillation | Not Observed | Not Observed |

In Table 2, the haze was measured in compliance with JIS K-7105. The frontal contrast ratio was determined as follows. Polarizer plates were prepared each employing one of the antiglare films of Practical Example 2 and Comparative Example 3, and were each laid on a 15-inch UXGA liquid crystal panel (TN mode). Then, with each of these combinations, the white brightness to the black brightness as observed from the front of the panel were measured, and the ratio of the former to the latter was determined as frontal contrast ratio.

The scintillation was determined as follows. Polarizer plates were prepared each employing one of the antiglare films of Practical Example 2 and Comparative Example 3, and were each laid on a 15-inch UXGA liquid crystal panel (TN mode). Then, with each of these combinations, a solid green pattern was displayed on the entire liquid crystal panel, and whether scintillation was observed or not was visually checked by 10 people. A combination that eight or more people evaluated as free from scintillation is indicated as "not observed," and any other combination as "observed."

As Table 2 shows, with Practical Example 2 embodying the invention, it is possible to alleviate scintillation while maintaining satisfactorily high frontal contrast ratio. By contrast, with Comparative Example 3, which employs an internal diffusion layer that exhibits isotropic diffusion, it is possible to alleviate scintillation, but with markedly lower frontal contrast ratio.

What is claimed is:

1. An antiglare film comprising an internal diffusion layer, composed of a transparent matrix and a transparent diffusive material, and a surface irregularities layer, said internal diffusion layer being distinct from said surface irregularities layer;
   wherein the diffusive material has a different refractive index from the transparent matrix, exhibits anisotropic diffusion resulting from an anisotropic shape of particles thereof, and is dispersed in the transparent matrix so that the longest axes of its respective particles are oriented substantially parallel to one another and to a normal to a surface of the film, and
   wherein a haze originating from the internal diffusion layer and a haze originating from the surface irregularities are controlled independently.

2. An antiglare film as claimed in claim 1, wherein the diffusive material comprises microcapsules.

3. A polarizer element comprising an antiglare film as claimed in claim 2 provided on a polarizer plate.

4. A display device comprising a polarizer element as claimed in claim 3 provided on a display panel.

5. A display device comprising an antiglare film as claimed in claim 2 provided on a display panel.

6. A polarizer element comprising an antiglare film as claimed in claim 1 provided on a polarizer plate.

7. A display device comprising a polarizer element as claimed in claim 6 provided on a display panel.

8. A display device comprising an antiglare film as claimed in claim 1 provided on a display panel.

9. A method of fabricating an antiglare film comprising an internal diffusion layer, composed of a transparent matrix and a transparent diffusive material, and surface irregularities, wherein the diffusive material has a different refractive index from the transparent matrix, exhibits anisotropic diffusion resulting from an anisotropic shape of particles thereof, and is dispersed in the transparent matrix so that the particles are oriented substantially parallel to one another and to a normal to the film, and wherein a haze originating from the internal diffusion layer and a haze originating from the surface irregularities are controlled independently,
   the method comprising a step of giving the diffusive material the anisotropic shape by applying an electric field to the diffusive material.

10. An internal diffusion film comprising an internal diffusion layer composed of a transparent matrix and a transparent diffusive material, wherein the diffusive material has a different refractive index from the transparent matrix, exhibits anisotropic diffusion resulting from an anisotropic shape of particles thereof, and is dispersed in the transparent matrix so that the longest axes of its respective particles are oriented substantially parallel to one another and to a normal to a surface of the film.

11. An antiglare film comprising an internal diffusion layer, composed of a transparent matrix and a transparent diffusive material, and surface irregularities, wherein the diffusive material has a different refractive index from the transparent matrix, exhibits anisotropic diffusion resulting from an anisotropic shape of particles thereof, and is dispersed in the transparent matrix so that the particles are oriented substantially parallel to one another and to a normal to the film, wherein a haze originating from the internal diffusion layer and a haze originating from the surface irregularities are controlled independently, and wherein the diffusive material comprises microcapsules obtained by encapsulating styrene or polycarbonate.

* * * * *